United States Patent [19]

Owen et al.

[11] Patent Number: 4,572,780
[45] Date of Patent: Feb. 25, 1986

[54] MULTISTAGE STRIPPER FOR FCC UNIT WITH CATALYST SEPARATION BY SPINNING

[75] Inventors: Hartley Owen, Belle Mead; Klaus W. Schatz, Skillman, both of N.J.

[73] Assignee: Mobil Oil Corporation, New York, N.Y.

[21] Appl. No.: 663,104

[22] Filed: Oct. 22, 1984

[51] Int. Cl.$^4$ .................. C10G 11/18; F27B 15/00
[52] U.S. Cl. .................. 208/161; 208/157; 422/144; 422/145; 422/214
[58] Field of Search .................. 208/161, 157, 158; 422/144, 145, 214

[56] References Cited

U.S. PATENT DOCUMENTS

| | | | |
|---|---|---|---|
| 2,542,587 | 2/1951 | Smith | 208/158 |
| 2,583,696 | 1/1952 | Held et al. | 208/161 |
| 2,656,242 | 10/1953 | Matheson | 23/1 |
| 3,007,778 | 11/1961 | Wood et al. | 208/161 |
| 3,152,065 | 10/1964 | Sharp et al. | 422/214 |
| 4,043,899 | 8/1977 | Anderson et al. | 208/161 |
| 4,161,917 | 7/1979 | Jubb | 422/145 |
| 4,173,527 | 11/1979 | Heffley et al. | 208/161 |
| 4,206,174 | 6/1980 | Heffley et al. | 422/144 |
| 4,219,407 | 8/1980 | Haddad et al. | 208/151 |
| 4,388,218 | 6/1983 | Rowe | 502/43 |
| 4,397,738 | 8/1983 | Kemp | 208/161 |
| 4,482,451 | 11/1984 | Kemp | 208/161 |

FOREIGN PATENT DOCUMENTS 0785797 4/1955 United Kingdom .......... 208/161

*Primary Examiner*—John Doll
*Assistant Examiner*—Lance Johnson
*Attorney, Agent, or Firm*—Alexander J. McKillop; Michael G. Gilman; Dennis P. Santini

[57] ABSTRACT

Disclosed is a method and apparatus for fluid catalytic cracking (FCC) of a hydrocarbon feed in an open or closed system, which includes a multistage stripper system. The multistage stripper system comprises a means for spinning a gasiform mixture of catalyst and cracked hydrocarbons exiting from a riser, a first means for stripping the spun gasiform mixture, and a means for deflecting the gasiform mixture to separate catalyst from the cracked hydrocarbons.

16 Claims, 17 Drawing Figures

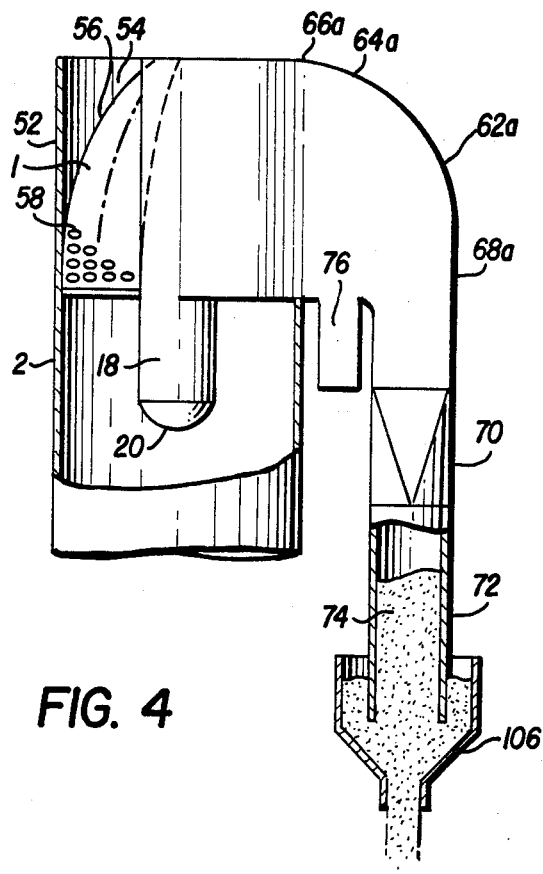
FIG. 4
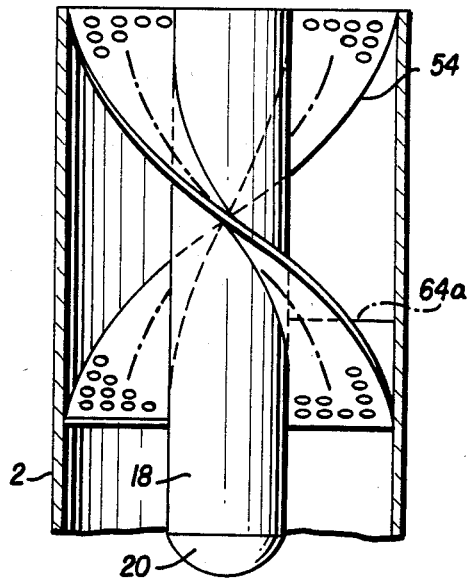
FIG. 3
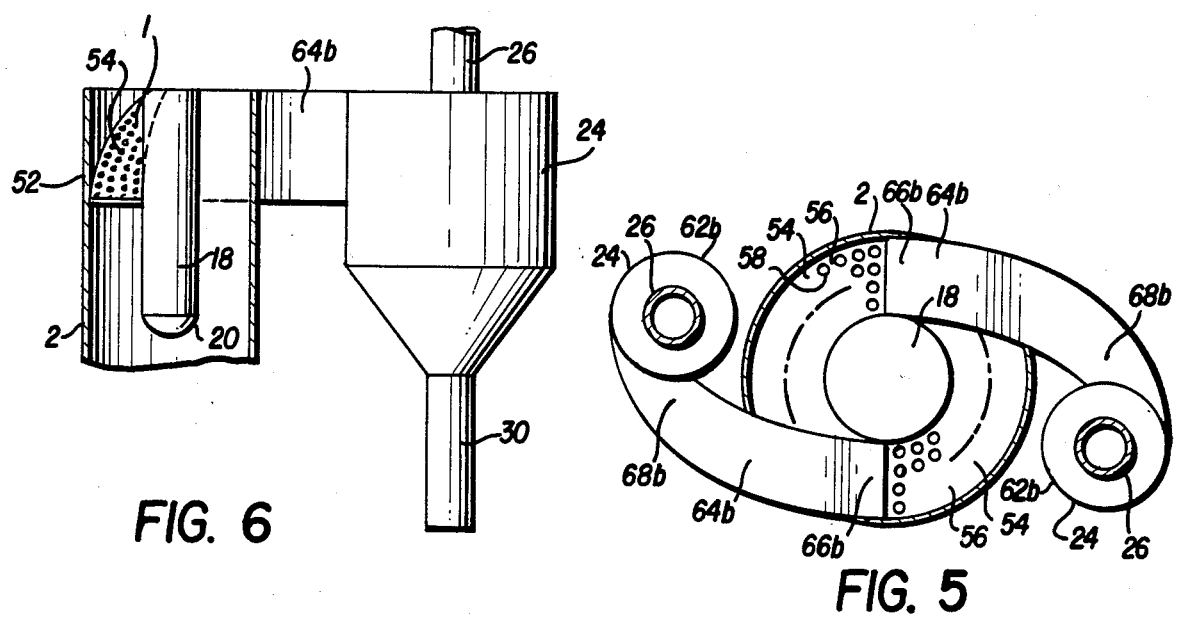
FIG. 6
FIG. 5

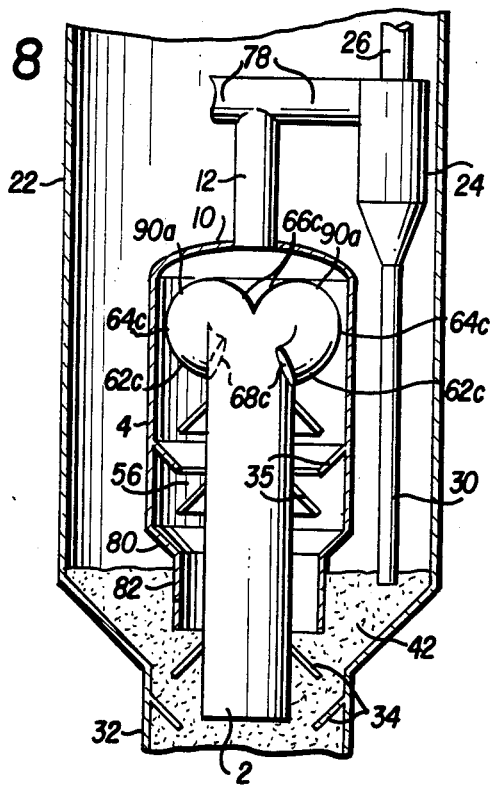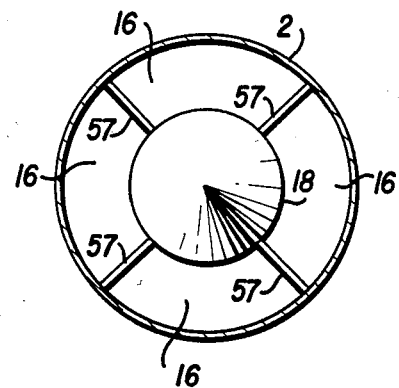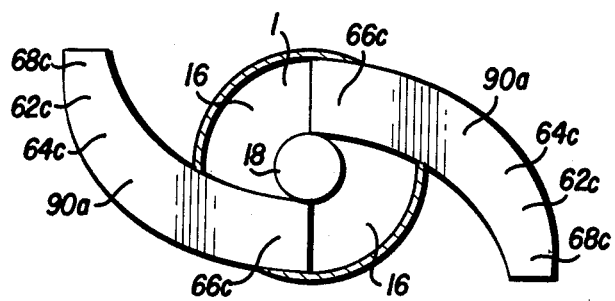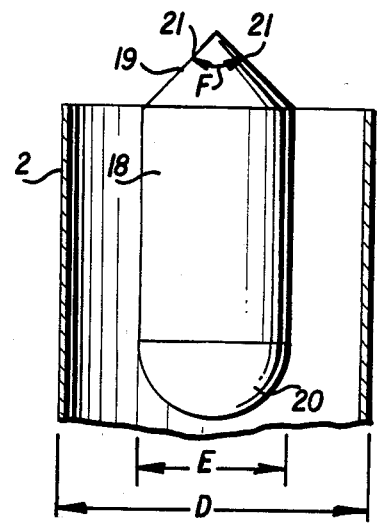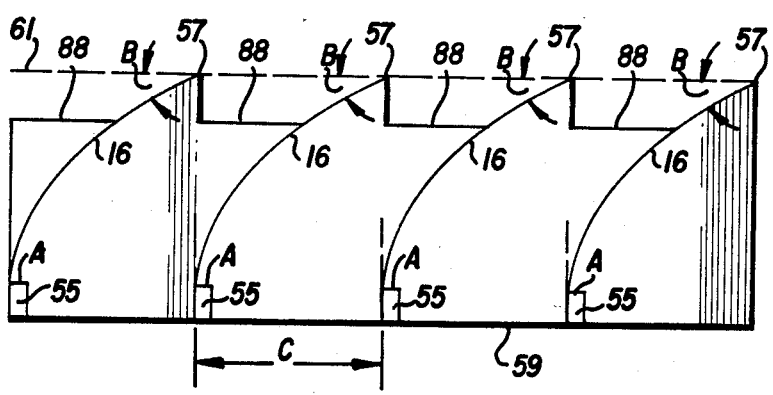

MULTISTAGE STRIPPER FOR FCC UNIT WITH CATALYST SEPARATION BY SPINNING

BACKGROUND OF THE INVENTION

1. Field of the Invention

The present invention relates to methods and apparatus for the separation of a catalyst and hydrocarbon materials in a fluidized catalytic cracking (FCC) unit and for subjecting the FCC catalyst to multistage stripping. More particularly, the present invention relates to an improved method and apparatus for reducing the contact time between catalyst and hydrocarbon materials within an FCC riser and after exiting from an FCC riser prior to separation by novel or conventional separating means.

2. Discussion of the Prior Art

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalyst, new areas of operating technology have been encountered requiring even further refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is particularly desirable for restricting hydrocarbon conversion time. During the hydrocarbon step, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, such as cyclonic equipment, and/or stripping gas in a separate catalyst stripping zone. Hydrocarbon conversion products separated and stripped from the catalyst are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gasiform mixture exiting the riser and containing catalyst particles and vaporous hydrocarbon product materials, particularly the separation of high activity crystalline zeolite cracking catalyst particles, under more efficient separating conditions so as to reduce overcracking of hydrocarbon conversion products and promote the recovery of desired products of a hydrocarbon conversion operation. Typically the gasiform mixture exiting the riser and containing catalyst particles and vaporous hydrocarbon product materials will exit the riser through a perpendicular conduit which is attached to cyclonic equipment. The cyclonic equipment is now typically used for efficient separation of fluidizable catalyst particles from the gasiform mixture. Passing gas from a riser to a perpendicular conduit can result in substantial erosion of the top of the riser where catalyst impinges before passing into the conduit. The impinging also has the disadvantage of increasing the residence time of catalyst within the riser. Another drawback is that the cyclonic equipment typically used for efficient separation of fluidizable catalyst particles from the gasiform mixture exiting from the riser, often permits an undesirable residence time of the product vapor within a cyclone. This extended residence time both from the impinging and within the cyclone reduces the desired product yield by as much as 4% through non-selective cracking. Recent developments in this art have been concerned with the rapid separation and recovery of entrained catalyst particles from the gasiform mixture.

Various processes and mechanical means have been employed heretofore to effect rapid separation of the catalyst phase from the hydrocarbon phase, at the termination of the riser conversion zone, to minimize contact time of the catalyst with cracked hydrocarbons.

U.S. Pat. No. 4,043,899 to Anderson et al discloses a system in which a mixture of catalyst and hydrocarbon gases pass from a riser into a stripping cyclone. Steam is admitted into the stripping cyclone to strip catalyst while in the cyclone.

U.S. Pat. No. 4,219,407 to Haddad et al describes a riser cracking-catalyst regeneration operation wherein a gasiform mixture discharged from a riser is passed into conduits with downwardly directed end portions to discharge a concentrated stream of catalyst separated from gasiform material into a downcomer zone and out of further contact with discharged gasiform material in the gasiform mixture. A stripping gas is used to particularly aid the separation of catalyst from the hydrocarbon vapors.

U.S. Pat. No. 4,206,174 to Heffley et al discloses an apparatus provided contiguous with a riser discharge which centrifugally initially separates a solid and gasiform mixture into a solid phase and a gasiform material phase prior to discharge from a riser into a cylindrical vessel. The centrifugal separation is provided by passing the gasiform mixture across stator type blades (fixed spaced apart sloping baffles), at or near the downstream end of the riser, to impart a spinning motion to the gasiform mixture. The catalyst may be further stripped, if desired, in equipment above and about the riser discharge.

While the above patents represent improvements in the field of rapid separation and stripping of hydrocarbon materials from catalyst particles, there is still a need to further reduce total contact time between hydrocarbon materials and catalyst to reduce to the extent possible non-selective cracking.

For example, a problem associated with the system of U.S. Pat. No. 4,206,174 to Heffley et al is that catalyst exiting the riser is separated from gasiform material only by centrifugal force. In addition, it is difficult to achieve significant catalyst stripping within the cylindrical vessel, thus extending total contact time. A difficulty with the system of U.S. Pat. No. 4,219,407 to Haddad et al and U.S. Pat. No. 4,043,899 to Anderson et al is that upwardly directed catalyst particles "impinge" off the top of a riser back into the continuous upward flow of hydrocarbon and catalyst. Thus, the downward velocity of the impinged particles must be reduced by the rising hydrocarbon/catalyst gasiform mixture before again moving upwardly in the riser toward its exit into a separating means. The additional contact time of hydrocarbon vapor and catalyst caused by the impinging effect produces overcracking and loss of precise control of cracked products.

SUMMARY OF THE INVENTION

It is an object of the present invention to provide an improved method and apparatus for contacting a hydrocarbon reactant with finely divided solid catalyst particles to form a gasiform mixture and for ensuring that a high percentage of catalyst particles remain in a riser conversion zone only for a desired period of time.

It is a further object of the present invention to provide a method and apparatus for separating catalyst from hydrocarbons by directing the flow of catalyst particles by a spinning motion out of the riser conversion zone, to contact the catalyst with a stripping gas which separates the catalyst from a portion of the hydrocarbons adhering to the catalyst, and to provide a means for deflecting the catalyst direction to separate catalyst from gasiform hydrocarbons.

It is a further object of the present invention to enhance separation of catalyst from gasiform material by subjecting a mixture of catalyst and gasiform material to centrifugal forces provided by a spinning means which also allows catalyst stripping, and by deflecting the catalyst away from the gasiform material.

It is a further object of the present invention to enhance separation of catalyst from gasiform material by subjecting a mixture of catalyst and gasiform material to a spinning means, a means for deflecting, and an upwardly flowing stripping gas.

In its apparatus aspects, the invention achieves the above and other objects in an apparatus for contacting a hydrocarbon reactant with finely divided solid catalyst particles in a gasiform mixture for cracking and, after cracking, for separating the mixture into a gasiform product stream separate from the particles which comprises: a riser conversion zone formed as a vertically disposed elongated tubular conduit having an upstream end and a downstream end; means for introducing hydrocarbon feed and catalyst into the upstream end of the riser conversion zone to produce a gasiform mixture of catalyst and cracked hydrocarbons which exits at the downstream end of the riser conversion zone; means for spinning the mixture at the downstream end of the riser conversion zone, around a longitudinal axis of the riser conversion zone; a first catalyst stripping zone adjacent to the means for spinning for contacting the catalyst in the gasiform mixture with stripping gas; and means for deflecting the catalyst from the spinning means to separate a major portion of the catalyst from the cracked hydrocarbons.

The apparatus may further comprise a second catalyst stripping zone for further stripping the separated catalyst. The means for spinning may comprise fixed spaced apart sloping baffles, and extensions may be attached to the baffles for directing the catalyst to the deflecting means.

In its method aspects, the invention achieves the above and other objects by the steps of: passing hydrocarbon feed and catalyst into an upstream end of a riser conversion zone to produce a gasiform mixture of catalyst and cracked hydrocarbon exiting at a downstream end of the riser located within a fluid catalytic cracking reactor, wherein the riser is a vertically disposed elongated tubular conduit; spinning the mixture by a means for spinning located within the riser at the downstream end thereof around a longitudinal axis of the riser to thereby form a spun mixture; passing the spun mixture into a first catalyst stripping zone for contacting the catalyst in the gasiform mixture with stripping gas; and contacting the spun mixture with a means for deflecting the catalyst to separate a major portion of the catalyst from the cracked hydrocarbons.

The method may further comprise the step of passing the stripped and deflected catalyst to a second catalyst stripping zone. The catalyst spinning step may be accomplished by passing the mixture across fixed spaced apart sloping baffles located in the downstream end of the riser conversion zone. Extensions may be attached to the baffles to direct catalyst from the riser to the catalyst deflecting means.

In addition, both the method and apparatus of the invention can be operated in compact form to facilitate retrofit into catalytic reactors which are too small for retrofiting with conventional technology. This compact form is achieved by directing the catalyst flow, by the spinning means and deflecting means, from the riser through one or more stripping zones.

BRIEF DESCRIPTION OF THE DRAWINGS

FIG. 3 is a side view along the lines A—A of FIG. 2;

FIG. 4 is a side view along the lines B—B of FIG. 2 and shows a seal pot at the lower end of a downcomer;

FIG. 5 shows a top view of a modification to the preferred embodiment wherein catalyst passes from the riser through a conduit which is directly attached to a cyclone separator;

FIG. 6 is a side view of the apparatus of FIG. 5;

FIG. 7 is a top view of another alternate embodiment of the invention wherein catalyst passes through a conduit directly into a cylindrical vessel (not shown);

FIG. 8 is a side view of the apparatus of FIG. 7 showing a closed conduit connecting the cylindrical vessel, containing a first catalyst stripping zone, to a cyclone, and a second catalyst stripping zone axially aligned with the catalytic reactor;

FIG. 11 shows a top view of the riser of FIG. 9;

FIG. 12 shows a side view of the downstream end of the riser of FIG. 9;

FIG. 13 shows a cut-open view of the riser and baffles of FIG. 10 to highlight the sawtooth cutouts in the riser wall;

DETAILED DESCRIPTION OF THE PREFERRED EMBODIMENTS

Figure 1:
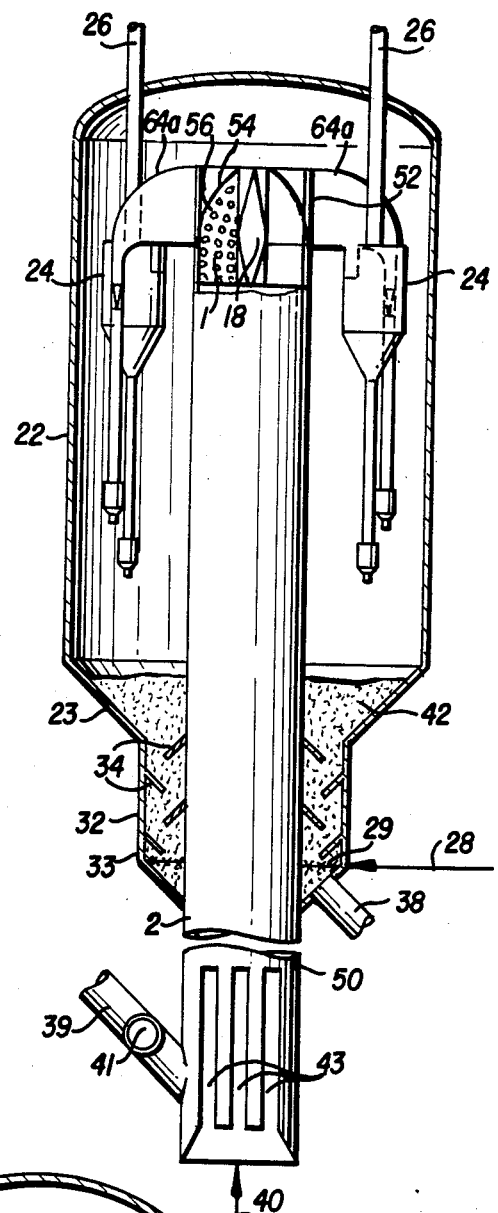
FIG. 1 is a diagrammatic sketch of a fluid catalytic cracking (FCC) system comprising fixed sloping baffles within a riser conversion zone, the baffles having perforations to allow catalyst stripping.
Figure 2:
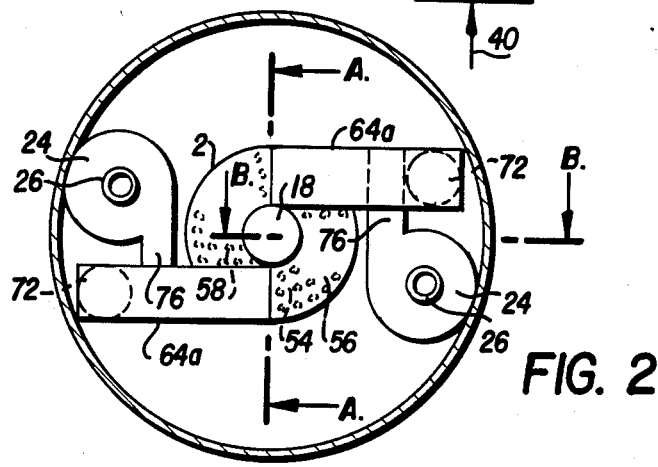
FIG. 2 is a top view of the apparatus of FIG. 1 and shows two symmetrical baffles attached to a concentric closed conduit (hub)

The present invention is directed toward a riser provided with a means for spinning catalyst, a means for deflecting the spun catalyst to separate catalyst from hydrocarbon gases and provided with at least one and preferably two or more zones of catalyst stripping, with a first stripping zone quickly removing a portion of hydrocarbons from the catalyst, and a second stripping zone, operating at more severe conditions, removing additional hydrocarbons. The present invention also provides a compact apparatus to retrofit small FCC systems. Various embodiments of the present invention are illustrated in FIGS. 1–7.

Multistage stripping is already known in the prior art, as, for example, disclosed in U.S. Pat. No. 4,043,899 to Anderson et al. In addition, a catalyst terminating in a cylindrical vessel and a riser comprising baffles is disclosed by U.S. Pat. No. 4,206,174 to Heffley et al and risers attached to conduits are disclosed by U.S. Pat. No. 4,219,407 to Haddad et al. The present invention is an improvement on these previous inventions.

The invention is also directed to a method and apparatus for performing short contact time stripping by using baffles having perforations which admit steam to contact and strip catalyst which passes along the perforated baffles before it exits the riser, as shown in FIGS. 1–6.

Referring now more particularly to the drawings, wherein like numerals represent like elements throughout the views, FIGS. 1–4 illustrate a first embodiment of an apparatus for performing a method of the invention. Catalyst passes into a riser conversion zone 2, comprising an upstream end 50 and downstream end 52, by means of a catalyst conduit 39, provided with valve 41, at the upstream end 50, while hydrocarbons pass through hydrocarbon conduit 40, with a multiple feed nozzle inlet means 43, for admixture with the catalyst. The catalyst is typically a hot regenerated catalyst, at a temperature of at least 1300° F. and more usually at least 1350° F. to form a gasiform mixture at a temperature of at least 1000° F. in the riser 2. The mixture passes through riser 2 to the downstream end 52, in which is located a spinning means 1, comprising spirally curved, perforated baffles 54, which direct the gasiform mixture of hydrocarbon and catalyst into at least one first conduit 64a (two are illustrated in FIGS. 1–4).

In the arrangement of FIG. 1, there are two perforated baffles 54, although there may be more, such as four. The number employed is a function of the mixture throughput and the diameter of the riser. The curved, perforated baffles 54 act to spin the mixture around the longitudinal axis of the riser. The perforated baffles 54 act as a first catalyst stripping zone 56 because the perforations 58 allow stripping gas from the reactor 22 to pass through the perforated baffles 54 to contact with catalyst passing along the underside thereof. The catalyst passes along the underside of the perforated baffles 54 due to the centrifugal force exerted on the catalyst by the spinning motion. The perforated baffles 54 are attached to the inside of the riser 2 and to a closed conduit (hub) 18 which lies along the longitudinal axis of the riser 2 and has a preferably hemispherical bottom portion 20. The perforated baffles 54 are in open communication with the catalytic reactor 22 to allow stripping gas contained therein to pass from the catalytic reactor 22 therethrough.

After passing baffles 54, the catalyst contained in the gasiform mixture then passes through the first conduit 64a, which has an upstream end 66a and a downstream end 68a, as seen in FIG. 4. Upstream end 66a is attached to the riser 2 and perforated baffles 54. The first conduit 64a includes a deflector 62a, which is a downward bend in conduit 64a, for providing a momentum to direct catalyst downwardly into a downcomer 72. Downcomer 72 may be attached to the downstream end 68a of the first conduit 64a by means of transition conduit 70. The downcomer 72 is sealed, to provide a closed cyclone system, by a catalyst seal 74 which is held in place by a sealpot 106 or by extending the downcomer 72 into a catalyst bed 42. The closed cyclone system allows the gasiform hydrocarbons to pass from the riser through the separating means and out of the catalytic reactor without passing into the atmosphere of the catalytic reactor.

Meanwhile, the gasiform material comprising hydrocarbons and remaining catalyst passes through a cyclone inlet duct 76 to a cyclone separator means 24. The cyclone inlet duct 76 may be openly attached to a lower wall of the first conduit 64a between its upstream end 66a and downstream end 68a, as shown in FIG. 4. Hydrocarbon conversion products and stripping gas are passed from the cyclone 24 by cyclone overhead conduit 26 communicating with a common header pipe (not shown) and in communication with a downstream fractionation zone (not shown).

A second catalyst stripping zone 32 may also be provided, as shown in FIG. 1. The second stripping zone 32 is formed by attaching one end of a frustoconical member 23 to the bottom of the reactor vessel 22 and the other end to side walls 33 of second stripping zone 32. The second stripping zone 32 is filled with a catalyst bed 42, which is contacted by fluidizing or stripping gas provided by gas conduit 28. The second stripping zone 32 is also in open communication with stripped catalyst withdrawal conduit 38. The second stripping zone 32 is provided with a plurality of downwardly sloping trays 34, arranged to enhance contact of downflowing catalyst with upflowing stripping and fluidizing gas provided by the gas conduit 28, which is attached to fluidizing or stripping gas header 29 located in the bottom of the second stripping zone 32. Catalyst is withdrawn through conduit 38 for passage to a catalyst regeneration zone (not shown), which in turn supplies catalyst to conduit 39.

The embodiment of FIGS. 1–4 of the invention provides for quick separation of catalyst and gasiform hydrocarbons at the downstream end 52 of the riser conversion zone 2 to eliminate undesirable post riser cracking and reduce additional coke formation and hydrocarbon entrainment. Directing the flow of catalyst particles by a spinning motion out of the riser prevents impinging of catalyst on the top of the riser 2, thus, reducing the catalyst residence time in the riser 2. The spinning means 1 also provides for an initial centrifugal separation of catalyst from gasiform hydrocarbons by forcing catalyst along the baffles 54 and the first conduit 64a attached to the baffles 54.

The embodiment of FIGS. 1–4 also provides for quick contacting of catalyst with a stripping gas in the first catalyst stripping zone 56. In addition, the embodiment of FIGS. 1–4 provides a deflector 62a to deflect catalyst away from gasiform hydrocarbons, thus further reducing undesirable post riser cracking.

In the embodiment shown in FIGS. 5 and 6, a catalyst deflector 62b is formed by a cyclone separator 24 which is attached to the downstream end 52 of the riser 2 by a first conduit 64b, comprising an upstream end 66b and a downstream end 68b. Conduit 64b is substantially horizontal and preferably curved to follow the curve of the baffles 54. A cyclone overhead conduit 26 conducts a stream comprising hydrocarbons and unseparated catalyst out of the cyclone separator 24.

FIGS. 7–17 disclose alternate embodiments of the invention. In each of these embodiments, a riser 2 terminates within a closed cylindrical vessel 4 (FIG. 9), containing a first catalyst stripping zone 56 and a deflector 62c (FIGS. 7, 8), 62d (FIG. 9), 62e (FIGS. 14, 15) or 62f (FIGS. 16, 17) to separate catalyst from hydrocarbons in the respective embodiments.

Figure 9:
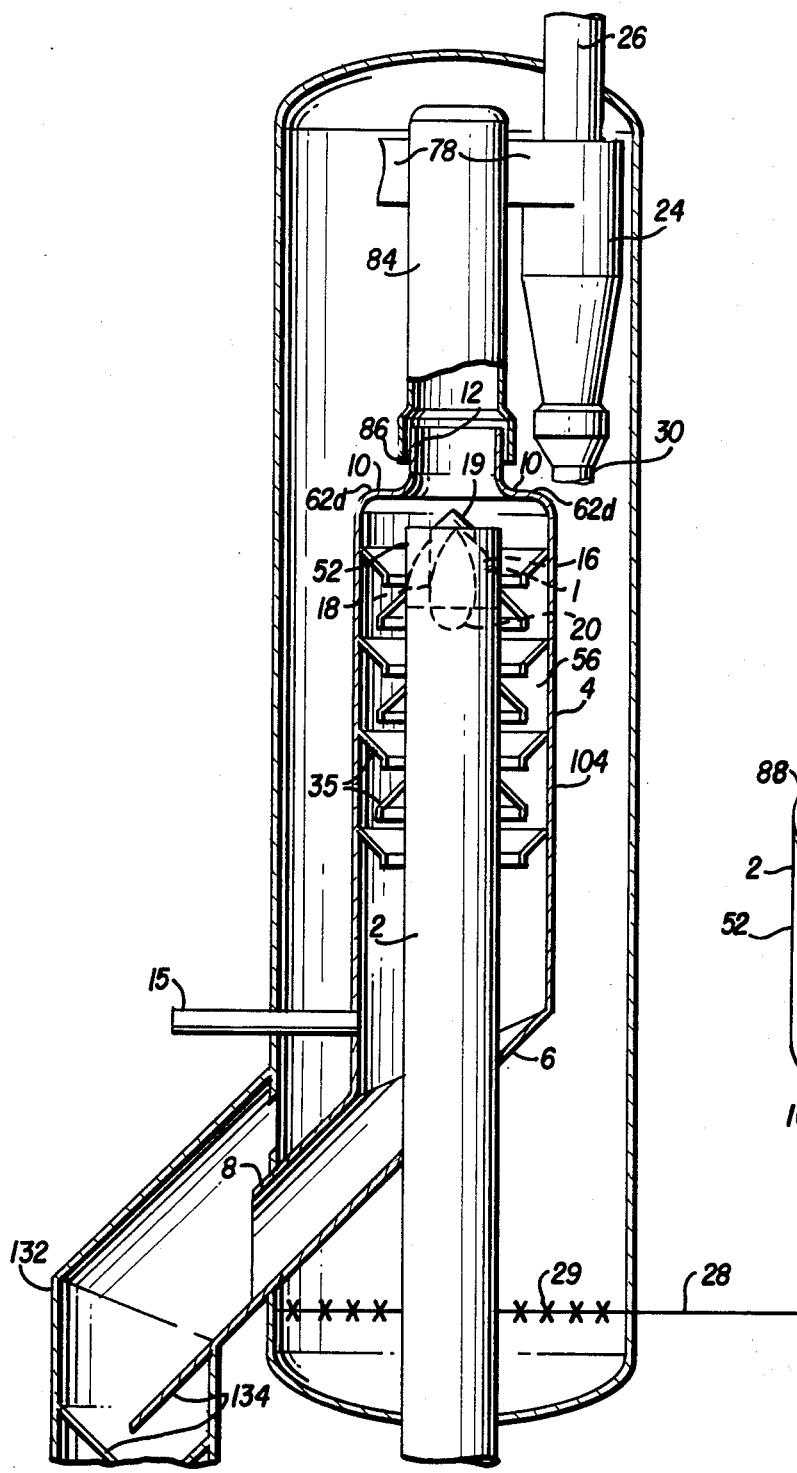
FIG. 9 shows a riser with its downstream end enclosed in a cylindrical vessel, baffles to direct catalyst from the riser to impinge on a top member of the cylindrical vessel, and an external second catalyst stripping zone.
Figure 10:
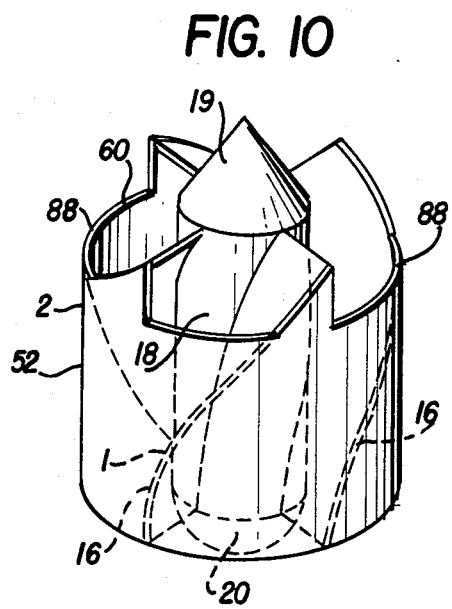
FIG. 10 shows a detailed view of one embodiment of the downstream end of the riser of FIG. 9 provided with optional sawtooth cutout sections.

FIG. 9 shows an apparatus for a fluid catalytic cracking (FCC) method comprising a riser 2, wherein the downstream end 52 of the riser 2 is attached to a means for spinning 1, comprising baffles 16 which spin the gasiform mixture and direct catalyst to a deflector 62d located within the cylindrical vessel 4. Baffles 16 comprise fixed curved spaced apart sloping baffles, resembling the perforated baffles 54, although the baffles 16 do not require perforations. The baffles 16 are arranged about the concentric closed conduit 18, comprising a conical top portion 19 with hemispherical bottom portion 20 (FIG. 10). In the arrangement of FIG. 9, there are two baffles 16, although there may be more, such as four. The number employed will be a function of the gasiform mixture throughput and the diameter of the riser. The closed cylindrical vessel 4 has a larger diameter than the riser conversion zone 2 and comprises sidewalls 104 attached to a top member 10 and a sloping bottom member 6. The top member 10 of vessel 4 is attached to a gasiform material withdrawal conduit 12, preferably positioned coaxially with vessel 4 and riser 2.

Catalyst, as shown in FIG. 9, is directed from riser 2 by the spinning means 1, which comprises the baffles 16, to contact the top member 10 of the cylindrical vessel 4 which acts as the deflector 62d. As shown by FIG. 9, the catalyst exiting the riser is in open communication with the atmosphere of the vessel 4 to allow stripping gas to contact with the catalyst. The top member 10 deflects catalyst downwardly into the first catalyst stripping zone 56 provided in the lower portion of vessel 4, where it contacts stripping gas, such as steam, provided by a stripping gas conduit 15. The conduit 15 is located to allow stripping gas to be directed upwardly by a conventional stripping gas distributor (not shown) within the vessel 4 and to promote separation of catalyst from hydrocarbon vapors. The cylindrical vessel 4 may also have trays 35 which are attached to the facing walls of the cylindrical vessel 4 and riser conversion zone 2. Gasiform material separated from the catalyst, comprising hydrocarbons and unseparated catalyst, passes through the gasiform material withdrawal conduit 12. Conduit 12 may be a continuous conduit attached to cyclone inlet duct 78, as shown in FIG. 8. Otherwise, as shown in FIG. 9, conduit 12 may be inserted into overhead duct 84 to form an annulus 85 to admit stripping gas into duct 84, which is in turn attached to cyclone separator 24 (one shown) by inlet duct 78 to provide a closed cyclone system.

The cylindrical vessel 4 of FIG. 9 further comprises a conduit 8 for withdrawing particles of separated catalyst attached to the bottom member 6. Catalyst passes from conduit 8 to an external second catalyst stripping zone 132, provided with downwardly sloping trays 134 over which the catalyst passes countercurrent to upflowing stripping gas introduced by a means (not shown) to a lower portion of the external stripping zone 132. The stripped catalyst is then withdrawn from the external stripping zone 132 for passage to catalyst regeneration (not shown). Alternatively, bottom 6 of cylindrical vessel 4, as disclosed by FIG. 9, can be of different shapes, as shown in FIGS. 8–17. Thus, as shown by FIG. 8, a frustoconical bottom member 80, and a conduit 82 for withdrawing particles of separated catalyst, which is concentric with the riser 2 and attached to the bottom member 80, can be provided. Conduit 82 also admits stripping gas from the second catalyst stripping zone 32 into the first catalyst stripping zone 56.

FIGS. 10–13 show details of the baffles 16 (four baffles shown) resembling those located in the downstream end 52 of the riser 2, shown in FIG. 9 (two baffles shown). The baffles 16 are attached to the closed conduit 18, which has the hemispherical bottom portion 20 and conical top portion 19. The baffles 16, as well as the perforated baffles 54 shown in other embodiments, may be substantially vertical at their upstream end 55 and form an angle A of 90° with a first horizontal axis 59, as shown in FIG. 13. At their downstream end 57, they preferably form an angle B of 30° with a second horizontal axis 61. As an example of suitable dimensions for the embodiment of FIGS. 10–14, the riser 3 may have a diameter D of 3 feet and a distance C of 2.36 feet from the edge 55 of one baffle 16 to the next baffle 16. The closed conduit 18 has a diameter E of one-half that of the riser 2, and the conical side walls 21 of the conical top portion 19 form an angle F of 100° with each other. FIG. 12 omits the baffles 16 to more clearly show closed conduit 18.

The downstream end 52 of the riser 2 may be provided with cutout sections 88 along the riser edge 60 to facilitate catalyst exiting from the riser 2 along the path provided by the baffles 16.

FIGS. 7, 8 and 14–17 show alternate embodiments of the invention. In these embodiments, extensions 90 are attached to the baffles 16. The extensions 90a (FIGS. 7, 8), 90b (FIGS. 14, 15), and 90c (FIGS. 16, 17) direct catalyst into cylindrical vessel 4 and allow the catalyst to contact respective deflectors 62c, 62e or 62f. The embodiment of FIGS. 7 and 8 has the extension 90a, comprising the first conduit 64c attached at its upstream end 66c to the baffles 16. The deflector 62c also has a downstream end 68c forming the first conduit 64c, which is curved downwardly to induce a downward momentum on the catalyst sufficient to direct the catalyst downwardly into the cylindrical vessel 4 towards the first catalyst stripping zone 56 located in the lower portion of the vessel 4. Stripping gas may be provided from either conduit 15, as in FIG. 9, or by locating the conduit 82 of cylindrical vessel 4 in open communication with the second stripping zone 32, as in FIG. 8. The stripping gas contacts with the catalyst and directs hydrocarbons stripped away from the catalyst overhead through gasiform material withdrawal conduit 12, which leads to an inlet duct 78 for a cyclone separator 24 (one shown) to remove any entrained catalyst. Separated catalyst passes through cyclone dipleg 30, while a stream comprising gasiform hydrocarbons passes through cyclone overhead conduit 26 to downstream processing, such as distillation (not shown).

Figure 14:
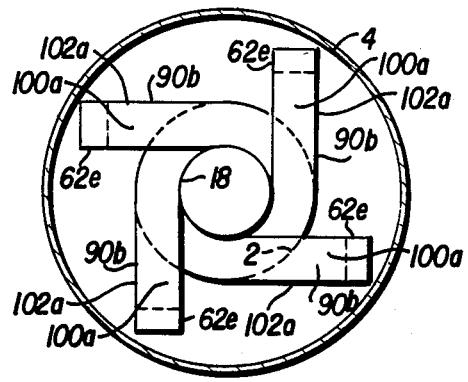
FIG. 14 is a top view of another embodiment of a riser terminating within a cylindrical vessel.
Figure 15:
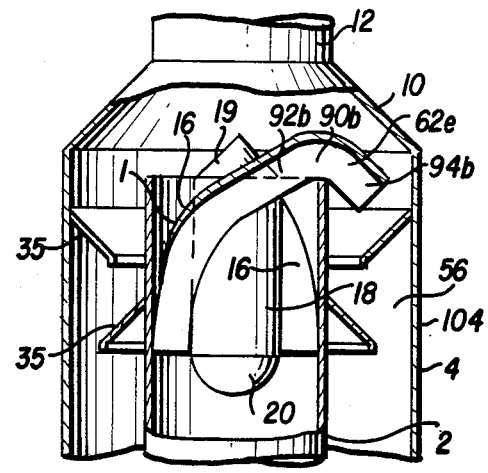
FIG. 15 is a side view of the embodiment of FIG. 14.

FIGS. 14 and 15 illustrate another embodiment of the invention, wherein the extension 90b is an open channel member comprising a top wall 100a attached to a side wall 102a. As shown by FIGS. 14–15, the extension 90b is open, so it allows stripping gas to contact the catalyst. The catalyst is driven by centrifugal force to pass along the surface of the top wall 100a and side wall 102a. The upstream end 92b of the extension 90b is upwardly directed and is attached to a downstream end 94b, which forms a deflector 62e which is a downwardly curved member for directing catalyst downwardly into the first catalyst stripping zone 56.

Figure 16:
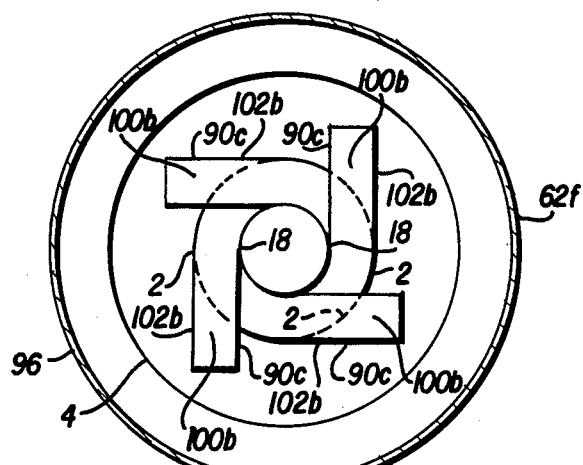
FIG. 16 is a top view of another embodiment of a riser terminating within a cylindrical vessel wherein the cylindrical vessel has an annular ring.
Figure 17:
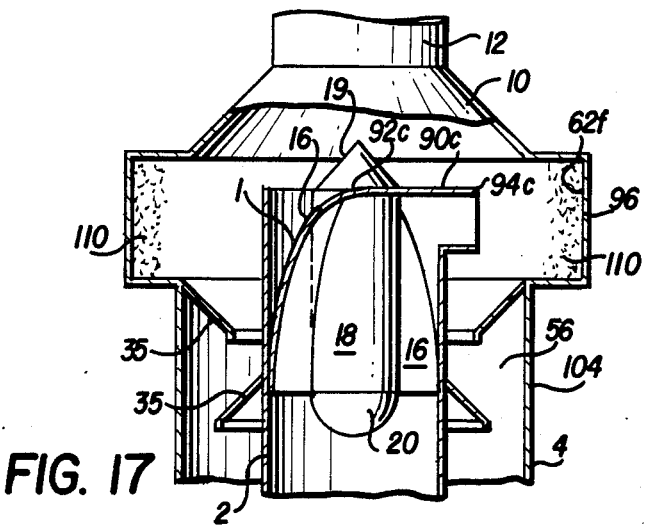
FIG. 17 is a side view of the embodiment of FIG. 16.

FIGS. 16 and 17 disclose another embodiment of the invention, wherein the extensions 90c are open channel members which are perpendicular to the riser 2 and direct the catalyst and hydrocarbon mixture to a catalyst deflector 62f comprising an annular pocket 96 in the sidewalls 104 of the cylindrical vessel 4. The extensions 90c may comprise a top wall 100b attached to a side wall 102b. As shown by FIGS. 16-17, the extension 90c is open, so it allows stripping gas to contact the catalyst. The annular pocket 96 is lined with rotating catalyst 110 so that the catalyst from the riser 2 does not directly impinge on the walls of the annular pocket 96. Catalyst drops from the annular pocket into the first catalyst stripping zone 56 and contacts with stripping gas countercurrently to push hydrocarbon gases upward through gasiform material withdrawal conduit 12, while allowing a major portion of the catalyst to drop through cylindrical vessel 4.

All of the embodiments disclosed in FIGS. 1–17 provide for quick separation of catalyst and gasiform hydrocarbons at the upstream end of a riser conversion zone 2 to eliminate undesirable post riser cracking, as well as additional coke formation and hydrocarbon entrainment.

Particularly, the embodiments of FIGS. 1–6 provide for quicker first zone catalyst stripping, as the perforated baffles 54 allow catalyst stripping before the catalyst exits the riser 2. The embodiments of FIGS. 7–17 provide for a more thorough first zone catalyst stripping, because the cylindrical vessel 4 allows more intimate contact of catalyst with stripping gas. In addition, the embodiments of FIGS. 1–6 are preferred for retrofitting existing facilities which do not have space within a catalytic reactor 22 for a cylindrical vessel 4, and which already include cyclones 24 which are adaptable to the embodiments of FIGS. 1–6.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

We claim:

1. A fluid catalytic cracking method comprising the steps of:

passing hydrocarbon feed and catalyst into an upstream end of a riser conversion zone to produce a gasiform mixture of catalyst and cracked hydrocarbon exiting at a downstream end of said riser located within a fluid catalytic cracking reactor, wherein said riser is a vertically disposed elongated tubular conduit, wherein said riser terminates within a confined vessel within said reactor;

spinning said mixture within said riser by a means for spinning located within said riser at said downstream end thereof, around the longitudinal axis of said riser to thereby form a spun mixture, wherein said spinning means comprises a plurality of fixed spaced apart sloping baffles provided within said riser;

passing said spun mixture directly to a means for deflecting said catalyst which separates a major portion of said catalyst from said cracked hydrocarbons, wherein said spun mixture is directed by said baffles directly to said deflecting means located within said confined vessel, passing said separated catalyst directly to said confined vessel comprising a first catalyst stripping zone for contacting said separated catalyst with stripping gas, said confined vessel comprising side walls attached to a top member and a bottom discharge member further comprising means for withdrawing particles of separated catalyst, and admitting stripping gas, to said first catalyst stripping zone, for directing hydrocarbon vapors upwardly to promote separation of catalyst from hydrocarbon vapors.

2. The method of claim 1, further comprising the step of passing said stripped and deflected catalyst to a second catalyst stripping zone.

3. The method of claim 1, further comprising the steps of:

passing gasiform material comprising hydrocarbons and unseparated catalyst through a gasiform material withdrawal conduit, said withdrawal conduit being spaced apart from said riser downstream end and attached to said top member;

wherein said first stripping zone comprises at least one tray and said catalyst spreads over said tray of said first stripping zone, wherein said stripping gas upwardly passes through said first stripping zone, thereby said stripping gas contacts said catalyst on said tray and displaces hydrocarbon entrained between particles of said catalyst.

4. The method of claim 3, further comprising the step of passing gasiform material from said withdrawal conduit to an overhead duct which is attached to a downstream cyclone separator and passing stripping gas through an annulus formed by an arrangement of said withdrawal conduit and overhead duct.

5. The method of claim 4, wherein said cyclone separating means is part of a closed cyclone fluid catalytic cracking system.

6. The method of claim 3, wherein said deflecting means is arranged so said mixture impacts on said top member and is deflected downwardly into said first catalyst stripping zone.

7. The method of claim 6, wherein said riser has at least one cutout section on the perimeter at the downstream edge of said riser, said method further comprising the step of passing catalyst through said cutout section.

8. The method of claim 3, wherein said catalyst is guided to said deflecting means by an extension attached to each baffle.

9. The method of claim 8, wherein said extension comprises a first conduit, and wherein said deflecting means is provided at a downstream end of said first conduit which is curved downwardly, said method further comprising the step of passing catalyst through said deflecting means downwardly into said first catalyst stripping zone.

10. The method of claim 8, wherein said extensions comprise open channel members, and wherein said deflecting means is provided at a downstream end of said open channel member which is curved downwardly, said method further comprising the step of passing catalyst along said deflecting means downwardly into said first catalyst stripping zone.

11. The method of claim 8, wherein said extensions comprise open channel members perpendicular to said riser, and said deflecting means comprises an annular pocket attached to said side wall of said confined vessel, said method further comprising the step of directing said catalyst along said open channel member into said deflecting means wherein said catalyst impacts with rotating catalyst.

12. A fluid catalytic cracking method comprising the steps of:
 passing hydrocarbon feed and catalyst into an upstream end of a riser conversion zone to produce a gasiform mixture of catalyst and cracked hydrocarbon exiting at a downstream end of said riser located within a fluid catalytic cracking reactor, wherein said riser is a vertically disposed elongated tubular conduit;
 spinning said mixture within said riser around the longitudinal axis of said riser to thereby form an spun mixture by a means for spinning at said downstream end thereof comprising a plurality of fixed spaced apart sloping perforated baffles located in an annular space within said riser;
 stripping said mixture in a first catalyst stripping zone by contacting said catalyst in said gasiform mixture with stripping gas simultaneously with said spinning step, wherein said first catalyst stripping zone comprises said perforated baffles, and said method further comprises the step of passing stripping gas through said plurality of perforations to contact with said catalyst; and
 passing said spun mixture directly to a means for deflecting said catalyst which separates a major portion of said catalyst from said cracked hydrocarbons.

13. The method of claim 12, further comprising the step of passing said stripped and deflected catalyst to a second catalyst stripping zone.

14. The method of claim 12, wherein said mixture passes through a first conduit having an upstream end and a downstream end, said upstream end thereof receiving said mixture from said perforated baffles and said first conduit directing said mixture to said deflecting means.

15. The method of claim 14, wherein said deflecting means is provided at said downstream end of said first conduit which is curved downwardly, said method further comprising the step of passing catalyst through said deflecting means to a downcomer which has a catalyst seal in a downstream end thereof and passing hydrocarbons and remaining catalyst through a cyclone inlet duct attached to said first conduit between said upstream and downstream ends thereof.

16. The method of claim 14, wherein said deflecting means comprises a cyclone separator, said method further comprising the step of passing said mixture through said cyclone separator and directing a major portion of said catalyst through a cyclone dipleg to a second catalyst stripping zone and passing a stream comprising said hydrocarbons and remaining catalyst through a cyclone overhead conduit out of said cyclone.

* * * * *